INVENTORS
BARRETT L. SCALLET
IRVING EHRENTHAL

3,305,395
HIGH D.E. CORN TYPE STARCH CONVERSION SYRUP AND METHODS OF MAKING SAME
Barrett L. Scallet, Clayton, and Irving Ehrenthal, University City, Mo., assignors to Anheuser-Busch, Incorporated, St. Louis, Mo., a corporation of Missouri
Filed Mar. 27, 1963, Ser. No. 268,267
21 Claims. (Cl. 127—30)

This application is a continuation-in-part of our co-pending application Serial No. 184,506, filed April 2, 1962, entitled, "High D.E. Syrup and Method of Making Same."

This invention relates to the prodution of sugar syrups by hydrolysis of starch with subsequent alkali treatment and partial separation of the resulting mixture of sugars.

More specifically, it relates to sugar syrups which are of higher sweetness than are any heretofore made from starch.

Heretofore, starch syrups have been produced by hydrolysis of starch with mineral acids under pressure, by acid and single enzyme conversions, and acid and dual enzyme conversions. All of these syrups have certain commercial uses and are satisfactory for certain purposes. However, all of the present processes have certain limitations, among these being a bitter taste in the acid converted syrup above 58–60 D.E., and the increased percentage of dextrose and the subsequent danger of crystallization due to the high dextrose concentration in the acid and single enzyme conversion syrups when the conversion is above 65 D.E. The acid and dual enzyme conversions have been carried to slightly above 70 D.E. on a commercial basis and, although the resultant syrup is yeast fermentable to the extent of about 80% to 90% of the total carbohydrate material, the content of rapidly fermentable sugars is not as high as is often desired by the user, as for example in baking.

Briefly, the invention described and claimed in our co-pending application Serial No. 184,506 comprises the isomerization of a high D.E., high glucose starch conversion syrup with a limited amount of alkali under continuously controlled and maintained pH conditions of about 8.5 to about 9.5 to produce a high D.E. syrup having less than about 45% glucose and at least about 10% fructose, which syrup is then passed through an ion exclusion and/or an ion exchange column to produce a non-crystallizing very sweet tasting syrup having a D.E. of about 70 to about 85, containing a substantial portion of rapidly fermentable sugars, and being free from objectionable color and impurities.

The invention described fully in co-pending application Serial No. 184,506 represents an advance over the prior art in the many particulars described therein. However, syrups prepared as indicated in the application Serial No. 184,506 are limited in D.E. to about 70 to about 85, in total ketose sugar content to about 15–33%, in fructose content to about 10–23%, in yeast fermentable carbohydrates to about 70–85%, and in sweetness to 70–85% of the sweetness of sucrose in dilute solution.

The present invention represents an improvement over the invention of Serial No. 184,506 in that the upper limits of all of the foregoing listed ranges of properties of the syrups are extended, and many other advantages are gained, as will be described hereinafter.

One of the principal objects of the present invention is to provide a novel syrup of high sweetness having above about 85 D.E. with a minimum amount of impurities, said syrup being non-crystallizing upon storage.

Another object of the present invention is to provide a syrup from starch which is approximately as sweet as sucrose or sweeter.

A further object of the present invention is to provide a syrup from starch which approaches the sweetness of invert sugar derived from sucrose.

A further object of the present invention is to provide a syrup from starch which is approximately as sweet as sucrose or sweeter, and which is non-crystallizing on storage for long periods of time at solids concentrations of about 80%.

Still another object of the present invention is to provide a syrup from starch which approaches the sweetness of invert sugar and which is non-crystallizing on storage for long periods of time at solids concentrations of about 80%.

Yet another object of the present invention is to provide a syrup from starch having a D.E. of about 85 or higher and containing a proportion of fructose approximately equal to the glucose content.

A still further object is to provide a very sweet syrup from starch of D.E. about 85 or higher containing a high proportion of rapidly-fermentable sugars.

Another object of the present invention is to provide a very sweet starch conversion syrup of D.E. about 85 or higher which is relatively free of impurities which might tend to inhibit fermentation.

Still a further object is to provide a syrup from starch which consists predominantly of fructose and other sweet ketose sugars with glucose as a minor constituent.

Still another object is to provide a syrup from starch consisting essentially of fructose and other ketose sugars.

Another object of the present invention is to provide a syrup from starch consisting essentially of fructose.

Another object of the present invention is to provide a process for producing the hereinbefore described syrups in which an acid-converted starch syrup is treated with a high-glucose-producing enzyme, further treated with alkali under carefully controlled conditions of pH, passed through an ion exclusion or an ion exchange purification process or a combination of the two, and finally passed through a molecular exclusion column or columns.

A further object of the present invention is to provide a starch conversion process wherein a high glucose syrup is treated with an alkali at continuously controlled and maintained pH conditions to convert a portion of the glucose to fructose and a portion of the remaining glucose is subsequently removed to leave a syrup high in fructose content and without excessive amounts of degradation products or salt.

A still further object is to provide a starch conversion process of the foregoing type wherein all of the remaining glucose is subsequently removed.

Yet another object is to provide a starch conversion process of the foregoing type wherein all sugars except fructose are removed.

A further object of the present invention is to provide a corn conversion syrup having approximately 80 to 130% of the sweetness of pure sucrose on a solids basis when tasted in dilute solution.

Yet another object of the present invention is to provide a molecular exclusion column or columns through which isomerized syrup from starch is passed to effect partial or complete separation of the sugars contained therein.

These and other objects and advantages will become apparent hereinafter.

Briefly, the present invention comprises the isomerization of a high D.E., high glucose starch conversion syrup with a limited amount of alkali under continuously controlled and maintained pH conditions of about 8.5 to 9.5 to produce a high D.E. syrup having less than about 80% glucose and at least about 10% fructose, which syrup is then passed through an ion exclusion and/or ion exchange column to produce a syrup having a D.E. of about 80 to about 100 and free from objectionable color and impurities, and finally passing this syrup through a molecular exclusion column or columns to remove a portion or all of the glucose and leave a syrup high in fructose. The present invention further comprises the treatment of an acid-converted starch hydrolyzate with an amyloglucosidase enzyme to produce the necessary high-glucose substrate for the isomerization treatment. This invention further includes the high D.E., high fructose-containing non-crystallizing syrups having a substantial proportion of rapidly-fermentable sugars, and the method of making same hereinafter described and claimed.

Figure 1:
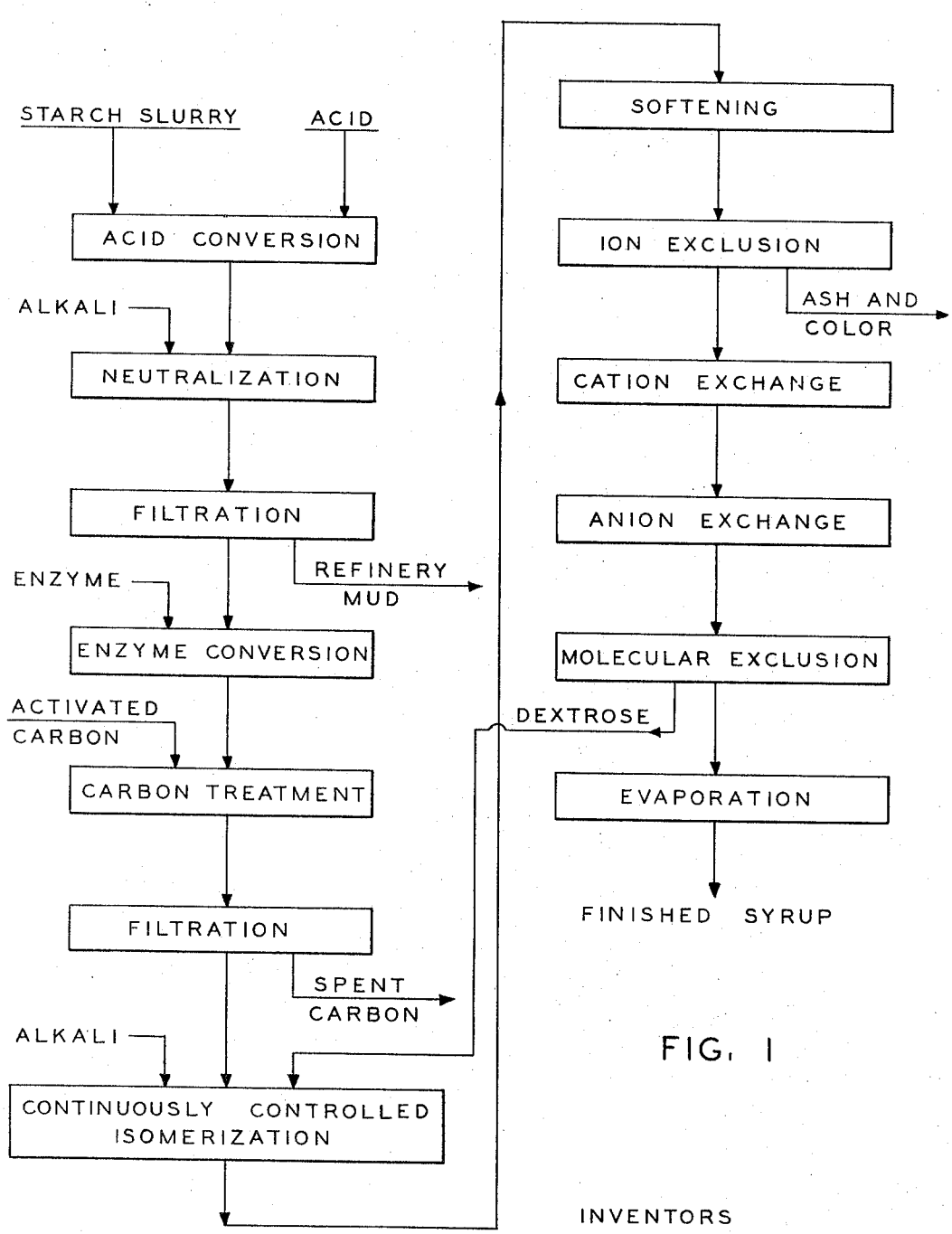
FIG. 1 is a flow diagram of one process of this invention.

The initial step contemplated in the present invention is an acid conversion step which may be any conventional treatment of a starch suspension which is well known in the art. The acid conversion is carried to about 18 to about 55 D.E., although in the preferred forms of the invention it is desirable to convert to the range 20–24 D.E. Conversion to this lower portion of the range permits attainment of higher D.E.'s in subsequent enzymatic treatment when this is desired. If a product of intermediate D.E. or sweetness properties is desired, it is permissible to convert to a higher range with acid. Selection of the D.E. for acid conversion will thus vary depending on the properties desired in the final product.

Following conversion the syrup is neutralized and filtered to remove fatty acids, protein, and other impurities.

The next step in the process involves treating the acid conversion product with a high-glucose-producing enzyme to produce a high-glucose substrate. This enzyme may be a fungal enzyme such as an amyloglucosidase. A suitable enzyme is "Diastase 69" or "Diastase 73" made by Rohm and Haas Company. Another suitable glucose-producing enzyme is "Diazyme" made by Miles Chemical Company. The amount of enzyme used depends on the particular enzyme and also on the time that the syrup is exposed to enzyme treatment.

The enzymatic treatment preferably is carried out at the optimum temperature for the action of the chosen enzyme. Temperatures of from about 55° C. to about 60° C. appear to be the most favorable operating temperatures. However, if the temperature is too high the enzyme will be inactivated, and if it is too low, the reaction will not proceed to completion at a commercially practical rate.

The pH of the enzymatic reaction can vary from about 3 to about 7, but preferably is held between about 4.5 and 5.1.

The enzyme treatment preferably utilizes about 0.15% by weight of dry enzyme based on the dry solids (D.S.) of the system for a 72 hour conversion, although greater or lesser amounts can be used and the conversion time varied accordingly. About 0.5% enzyme is used if a liquid enzyme preparation is used, also on a D.S. basis. The foregoing amounts of enzymes are based on utilization of presently available products at the enzyme activity customarily provided. Although the enzyme will produce a D.E. of up to about 100 under the best conditions, the reaction preferably is stopped at a D.E. of about 95, since the attainment of higher D.E. values is costly in terms of enzyme, time, or both. It is desirable to produce an enzyme conversion product as high in glucose as possible so that the maximum amount of fructose will be formed subsequently. The glucose content of the enzyme conversion product at 95 D.E. is ordinarily about 92% on the solids basis.

Other methods of producing a high glucose-containing substrate may be used but it is believed that the acid and amyloglucosidase enzyme conversion provide the most practical present-day processing steps.

Following a carbon treatment and filtration to remove some of the color, the high glucose substrate is treated with alkali to convert a portion of the glucose to ketose, principally the sweeter sugar fructose. The alkali treatment is continued for 1–10 hours, preferably about 1 to about 5 hours at a temperature of about 60° C. to about 68° C. with the pH being continuously maintained during the alkali treatment at a value within the range of about 8.5–9.5. In the preferred commercial process, the alkali treatment is continued for about 4–4.5 hours at a temperature of 64–65° C. and a pH of 8.9–9.1.

The preferred alkali is sodium hydroxide. The minimum amount of alkali is used, since excess alkali results in formation of salts and degradation products which must be removed by the ion exclusion and/or ion exchange columns, thus decreasing the capacity of said columns. Excess amounts of alkali also produce organic acids which inhibit yeast fermentation when the unpurified syrups are used in baking.

If the total amount of alkali is initially added rapidly to the syrup, it has the effect of raising the pH to a very high level and produces excessive amounts of degradation products. The pH then drops during the reaction and isomerization is slowed. Thus it is essential to the present invention that the pH be continuously controlled and maintained within the range of 8.5–9.5, preferably 8.9–9.1, during the isomerization. Furthermore, if the pH drops too low, below 8.5, the conversion of glucose to fructose is slowed considerably or stopped. Since the alkali is being continuously consumed and neutralized by the organic acids produced, it is necessary that alkali continuously by added to maintain the pH at the predetermined level.

The amount of alkali used on a dry solids basis (D.S.B.) is expressed in grams of alkali per gram of dry solids and varies from about 0.001 to about 0.025.

The product syrup recovered from the isomerization treatment has about the same D.E. as the entering syrup, namely about 95 in the preferred form of the invention, but the glucose content has been lowered from 92% to about 59–62% D.S.B., while the ketose content has been raised from 0 to about 30–33%. The original disaccharide content of about 8% remains at about that level, although a portion of the disaccharides present may also be isomerized to ketose-type disaccharides.

The isomerized syrup contains only about 1% or less of salt which must be removed by the ion exchange and/or ion exclusion treatment. If much more salt were present, it would be uneconomical under present conditions to use the ion exchange or ion exclusion columns, which are necessary to remove the color, organic acids, etc. from the isomerized syrup.

By maintaining the isomerization reaction at about pH 9, loss of fermentables during the isomerization treatment is minimized, since the formation of known organic acids from the fermentable sugars during the isomerization treatment also is minimized. Although a small amount, less than 5%, of fermentables may be lost by continuously maintaining the pH at between 8.5–9.5, the large amount of fructose produced from the glucose and the increased sweetness of the resultant syrup more than compensate from the loss of fermentables. The overall loss of fermentables from the initial high glucose syrup to the final sweet syrup should not exceed about 1–5%.

In one purification method, the product from the isomerization reaction is passed immediately to an ion exchange column which consists of a weak base anion exchange resin such as "XE-168" or "XE-225" made by Rohm & Haas Company, and a strong acid cation exchange resin such as "Amberlite 200" also made by Rohm & Haas. The weak base anion exchange resin is extremely important and removes the color and organic acid anions from the syrup. The syrup enters the column at a pH of 8.5–9.5 and leaves at a pH of 5.8–6.5 at the rate of about 0.2–0.5 gallon per cubic foot of resin per minute. The ion exchange column also removes the ash from the isomerization product. In other respects, the syrup from the ion exchange column is identical to the syrup entering from the isomerization vessel. The color of the syrup entering the column is dark reddish brown, while the final product is substantially colorless, or at most, a light amber color. The syrup which does not have the ion exchange treatment inhibits yeast fermentation and thus is not suitable for baking. Although the specific impurities in the isomerized but unpurified syrup which cause this have not been identified at the present time, they are obviously of ionic nature since they are removed by ion exchange treatment.

In an alternate purification step, instead of the foregoing ion exchange treatment of the isomerized syrup, the high glucose syrup from the isomerization reaction is treated in an ion exclusion process to remove the impurities. A system is used which utilizes a resin which separates the impurities so that the salts and other impurities come out of the column before the purified syrup and are thereby separated from the syrup. The system can be operated as a batch process or as a continuous process when appropriate equipment is used.

The ion exclusion column contains a strong acid cation exchange resin in the sodium form such as "DOWEX 50 WX-4" of Dow Chemical Company. The resin is a polystyrene divinylbenzene having 4% cross divinylbenzene linkages and of 50–100 mesh. The isomerized syrup is passed through the column at the rate of 0.5–1.5 gallon per square foot of cross sectional area of the column. The porous resin absorbs the syrup, but retains the impure degradation products of ionic form including colored products and inorganic ions on the outer surfaces from which they are washed by water which is passed through the column after the syrup addition has been completed. The first effluent contains primarily color, impurities, and inorganic salts. The subsequent effluent contains almost all of the sugars, and leaves the column substantially clear of the brown color of the entering syrup. At least 90% of the original color and even more of the inorganic ionic materials can be removed in this way.

Figure 2:
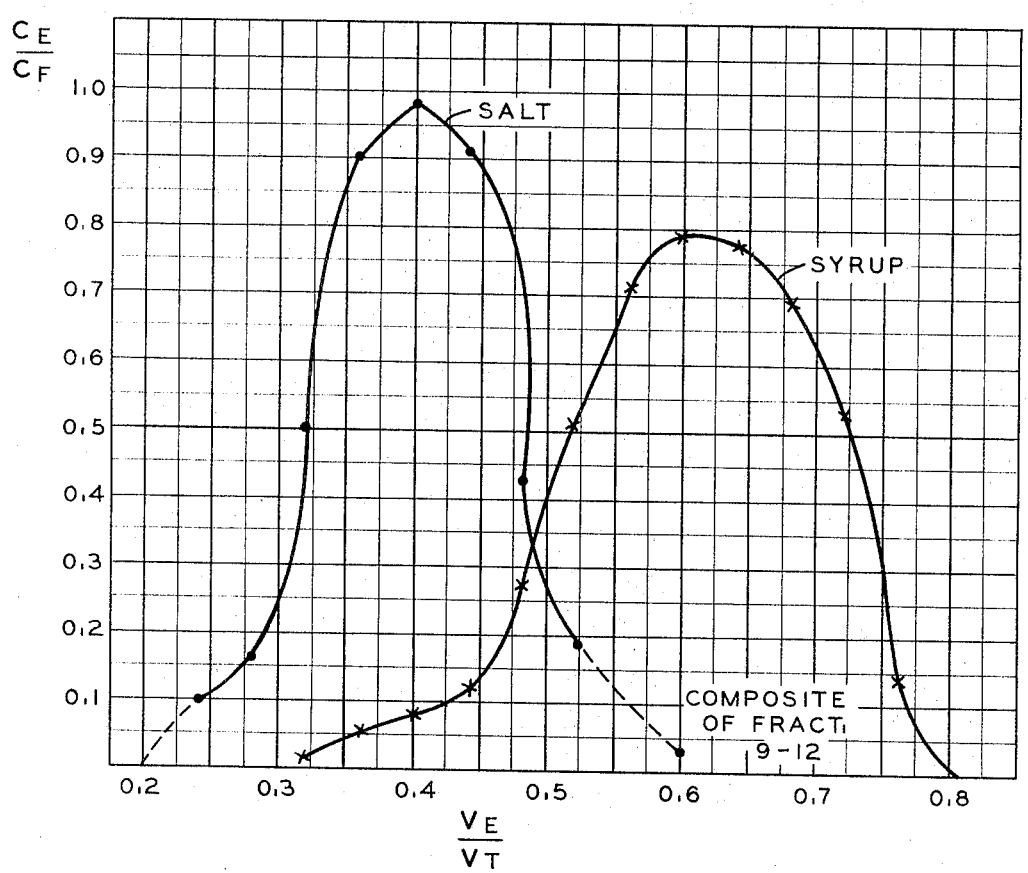
FIG. 2 is a graph of one sample passed through an ion exclusion bed.

FIG. 2 shows a sample graph of an ion exclusion process as hereinbefore described.

The product from the ion exclusion column is concentrated and may be carbon treated to remove further color, if desired.

Alternatively, the product from the ion exclusion column can be passed to an ion exchange column or columns containing an anion exchange resin and cation exchange resin (as hereinbefore described) to remove further trace amounts of color, salt, etc.

The ion exclusion purification process may advantageously be performed in semi-continuous processing equipment of the types known as Higgins contactors or Asahi contactors, which permit more economical operation on a large scale than does the use of a simple column. However, the principle of separation is the same in either case.

Figure 3:
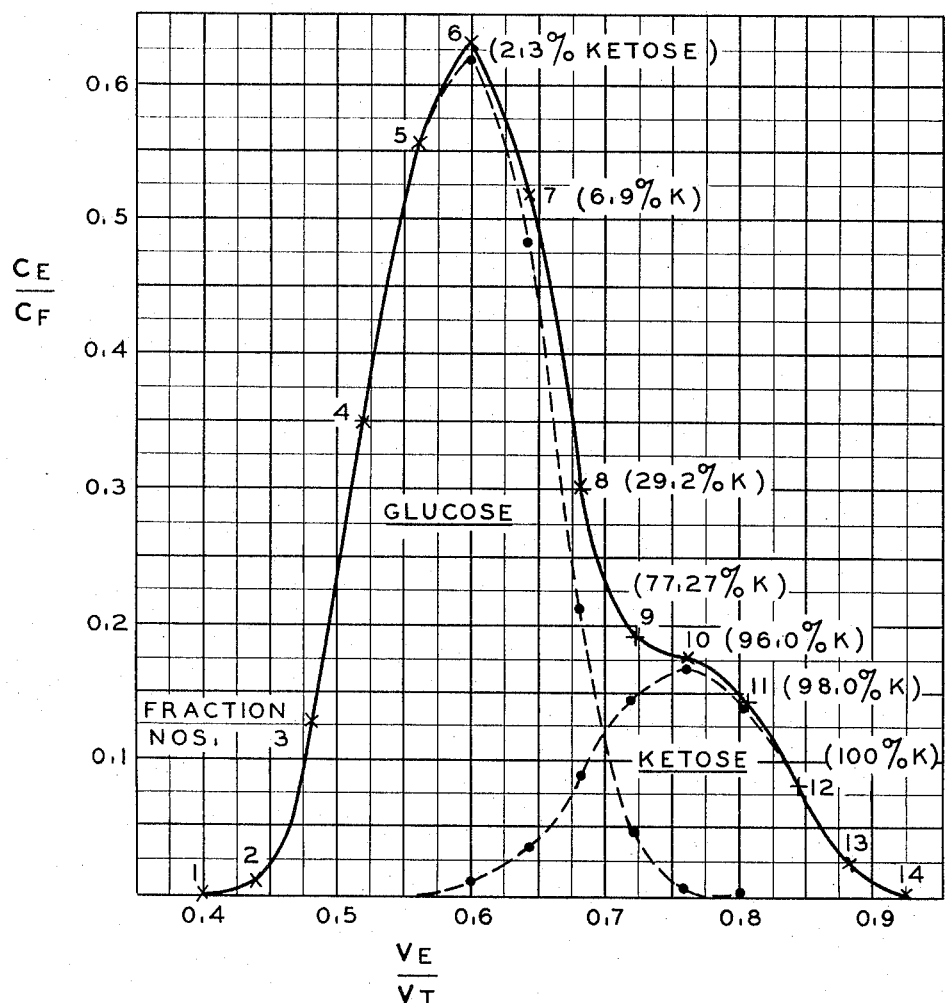
FIG. 3 is a graph of a ketose-glucose separation by molecular exclusion.

The decolorized and deionized isomerized syrup is next subjected to a molecular exclusion process in a column containing an ion exchange resin of suitable type in the strontium, calcium or barium form as described in U.S. Patents Nos. 3,044,904 and 3,044,905. Under suitable conditions the first portion of the effluent from the column is a solution consisting primarily of disaccharides and higher sugars, followed by a solution of relatively pure glucose containing some disaccharides. Subsequent portions of the effluent contain a mixture of all of the other sugars present, as shown in FIG. 3 and Tables 1 and 2. FIG. 3 is a graph of Table 1. A substantial portion of the glucose, disaccharides, and higher sugars present in the input to the column cap in this manner be removed from the other sugars, leaving a syrup whose content of fructose and other sweet ketose sugars has been substantially increased. The relatively pure glucose solution removed from the column can be returned to the process at the point just prior to isomerization (FIG. 1), thus permitting ultimate utilization of all of the sugar to form the finished syrup of enhanced fructose or other sweet sugar content.

TABLE 1

[Feed=21.4% Ketose]

| Fraction (100 cc./fract.) | Weight D.S. fract. (gms.) | D.S. Cumulative (gms.) | Weight Ketose/ fract. (gms.) | Percent Ketose/ fract. | Weight Fructose Cumulative (gms.) |
|---|---|---|---|---|---|
| 1 | | | | | |
| 2 | .29 | .29 | | | |
| 3 | 3.75 | 4.04 | | | |
| 4 | 10.60 | 14.64 | | | |
| 5 | 17.40 | 32.04 | | | |
| 6 | 19.85 | 51.89 | .457 | 2.3 | .46 |
| 7 | 16.05 | 67.94 | 1.11 | 6.9 | 1.57 |
| 8 | 9.20 | 77.14 | 2.69 | 29.2 | 4.26 |
| 9 | 5.70 | 82.84 | 4.40 | 77.2 | 8.66 |
| 10 | 5.15 | 87.99 | 4.94 | 96.0 | 13.60 |
| 11 | 4.18 | 92.17 | 4.10 | 98.0 | 17.70 |
| 12 | 2.40 | 94.57 | 2.40 | 100 | 20.10 |
| 13 | .71 | 95.28 | .71 | | 20.81 |
| 14 | .07 | 95.35 | .07 | | 20.88 |

TABLE 2

[Feed=29.5% Ketose]

| Fraction (100 cc./fract.) | Weight D.S. fract. (gms.) | D.S. Cumulative (gms.) | Weight Ketose/ fract. (gms.) | Percent Ketose/ fract. | Weight Fructose Cumulative (gms.) |
|---|---|---|---|---|---|
| 1 | | | | | |
| 2 | | | | | |
| 3 | 2.79 | 2.79 | | | |
| 4 | 9.11 | 11.90 | | | |
| 5 | 16.05 | 27.95 | | | |
| 6 | 20.05 | 48.00 | 0.472 | 2.3 | .47 |
| 7 | 17.70 | 65.70 | 1.255 | 7.1 | 1.73 |
| 8 | 11.08 | 76.78 | 3.46 | 31.3 | 5.19 |
| 9 | 8.20 | 84.98 | 6.10 | 74.3 | 11.29 |
| 10 | 6.86 | 91.84 | 6.56 | 95.7 | 17.85 |
| 11 | 5.48 | 97.32 | 5.48 | 100 | 23.33 |
| 12 | 3.36 | 100.68 | 3.36 | | 26.69 |
| 13 | 1.67 | 102.35 | 1.67 | | 28.36 |
| 14 | | | | | |

As in the case of the ion exclusion purification portion of the process, it is advantageous to use for the molecular exclusion process one of the semi-continuous contactors of the Higgins or Asahi types. By this means more efficient separation of the dextrose may be attained, with less dilution of the dextrose portion as well as the ketose-containing portion of the effluent than is usual for treatment in the ordinary type of column.

The ketose-containing portion of the effluent from the molecular exclusion process has a composition which depends on the amounts of glucose, disaccharides, and higher sugars which have been removed from the input syrup. Taking the syrup input of the preferred form of the invention as given above to contain about 59–62 parts glucose, 30–33 parts ketose, and 8 parts of disaccharides per 100 parts of solids, removal of approximately 35 parts of glucose and 5 parts disaccharides and higher sugars is possible in one pass through the molecular exclusion unit under proper conditions. Potential maximum removal is determined by measurement of the urea under the curve to the left of the ketose-containing portion of the effluent as shown in FIG. 3.

In both of these cases fractions through No. 5 are completely free of ketose, and a portion of fraction 6 is also. Even if the entire quantity of fraction 6 is included with the glucose-disaccharide-higher sugar portion, the amount of ketose carried along is less than 1%, which is negligible from the practical stand point. FIG. 3 and Tables 1 and 2 demonstrate that 47 to 54% of the total solids in the form of glucose, disaccharides, and higher sugars can be removed in one pass through the column while leaving substantially all of the ketose in the remaining effluent. However, under practical operating conditions the removal of 40 parts of solids is more readily attained. This then leaves in the ketose-containing effluent about 24–27 parts of glucose, 30–33 parts of ketose, and 3 parts of disaccharides for a total of about 60 parts. Expressed on the basis of percentages of the total solids present, the composition of the fructose-containing effluent is thus 40–45% glucose, 50–55% ketose, and 5% disaccharides. The ketose portion of this syrup is predominantly fructose, this sugar amounting to about 47–52% of the total solids, while the remaining ketoses, principally psicose, amount to about 3%.

The composition of the above syrup is a particularly advantageous one, since the dextrose content of 40–45% is at a level which is conducive to long storage life of the finished syrup without crystallization of dextrose, as explained in our co-pending application. Furthermore, the content of fructose and other sweet ketoses is so high that the resulting syrup approaches the sweetness of invert sugar prepared from sucrose, which consists of 50% glucose and 50% fructose on the solids basis.

Another advantage of the above syrup is that it can be concentrated to a solids content of 80–82% (water content 18–20%) without danger of crystallization and without danger of growth of microorganisms on the surface or in the body of the syrup.

Invert sugar can ordinarily be prepared from sucrose only to a maximum solids content of about 76% at ordinary temperatures. At this concentration, dextrose can crystallize and precipitate from the solution on standing, and the syrup is furthermore prone to support the growth of microorganisms, particularly at the surface, but sometimes within the body of the syrup. Concentration of the invert syrup to 80% solids or higher prevents the microbiological growth, but increases the amount of crystallization. Because of these factors, when invert sugar is used commercially (as is also the case for sucrose solutions, ordinarily handled at about 68–70% solids) the tank containing it is usually carefully enclosed, irradiated with ultraviolet light, and handled with strict sanitary precautions.

It is therefore evident that the proper balance of sugars in the above-described syrup, produced by the preferred method of operation, results in numerous advantages, not only over the corn syrups disclosed in our co-pending application, but also over existing industrially-used types of liquid sweeteners of the sucrose and invert sugar group.

As indicated earlier, a wide range of products containing lower amounts of ketose sugars can be prepared in similar fashion, either by using a substrate for the alkaline isomerization of lower D.E. or by carrying out the isomerization to a smaller extent. However, since the sweeter ketose sugars have a greater economic value the process as spelled out above is ordinarily preferred. Since syrups containing even higher proportions of fructose are of even greater value, a further step or steps can be carried out in the molecular exclusion units to increase the fructose content even more. The syrup of composition 40–45 parts of glucose, 47–52 parts of fructose, 3 parts of other ketoses, and 5 parts of disaccharides is passed through the molecular exclusion column to remove about 20 parts of glucose and 3 parts disaccharides and higher sugars, leaving about 20–35 parts of glucose, 47–52 parts of fructose, 3 parts of other ketoses, and 2 parts of disaccharides for a total of about 77 parts. Calculated on a percentage basis, this syrup contains about 26–32% glucose, 61–67% fructose, 4% other ketoses, and 3% disaccharides.

Under proper conditions of operation, a syrup of the above composition can be put through the molecular exclusion equipment to recover about 25 parts of a substantially pure solution of fructose, leaving in the remaining portion of effluent a mixture of sugars which is commercially of value. Its composition is 26–32 parts glucose, 36–42 parts fructose, 4 parts other ketose, and 3 parts disaccharides, for a total of 75 parts. In percentage figures, this is 35–43% glucose, 48–56% fructose, 5% other ketoses, and 4% disaccharides.

The compositions of the various syrups referred to in the above series of steps are shown in Table 3 for ready comparison.

TABLE 3.—PERCENTAGE SUGAR COMPOSITIONS OF SYRUPS

| Syrup | Description | Percent Glucose | Percent Fructose | Percent Other Ketoses | Percent Disaccharides and higher sugars |
|---|---|---|---|---|---|
| A | Product of copending appln | 40–45 | 10–23 | 2–10 | 22–48 |
| B | Substrate for isomerization step | 92–96 | 0 | 0 | 4–8 |
| C | Product from isomerization step | 59–62 | 27–30 | 2–4 | 8 |
| D | Product of one pass through molecular exclusion column | 40–45 | 47–52 | 3 | 5 |
| E | Product of two passes through molecular exclusion column | 26–32 | 61–67 | 4 | 3 |
| F | Pure fructose fraction from E | 0 | 100 | 0 | 0 |
| G | Product remaining after removal of F from E | 35–43 | 48–56 | 5 | 4 |

Table 4 gives the weight distribution of the various sugars in the fractions whose compositions are listed in Table 3. Table 4 gives, in effect, a material balance for the various steps which may be taken after the initial acid-enzyme hydrolysis of starch by the preferred method. It is based upon the initial 100 part quantity of sugars formed by hydrolysis of about 90 parts of starch solids. During this hydrolysis about 10 parts of water are added as water of hydrolysis in the well known manner.

Figure 4:
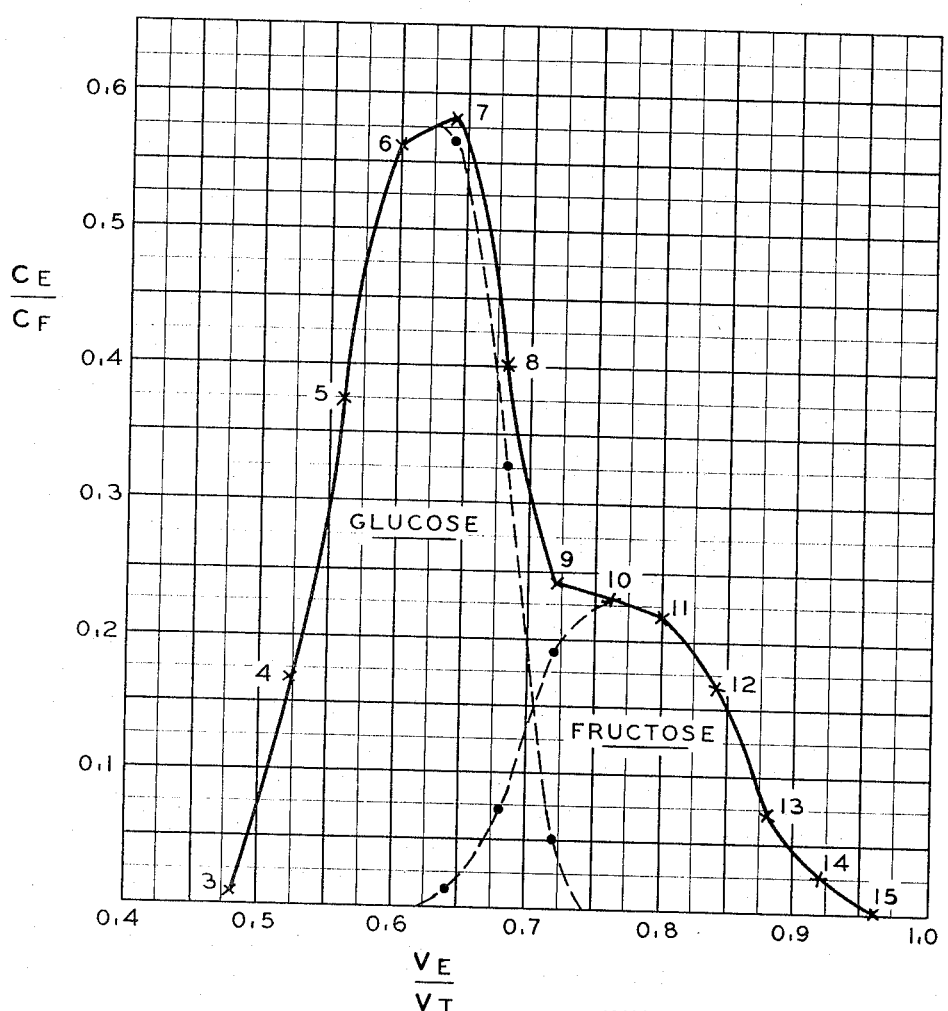
FIG. 4 is a graph of a glucose-fructose separation.

It is possible to obtain even better separations of the glucose and ketose portions of the syrup in a single pass through the molecular exclusion column than is indicated above by operating at lower solids concentration as shown in FIG. 4, where the feed concentration is 18.6% solids. However, the relatively slow rate of feed through the column which is necessary to obtain the best separation makes it desirable to keep to a minimum the total volume of solution fed, and therefore the concentration of solids is advantageously kept at about the level of 30% for practical operations. The figures in Tables 3 and 4 are based upon this input concentration. FIG. 3 shows the separation attained at a feed concentration of 29.33% solids. The area of overlapping of the glucose and fructose curves in FIG. 3 is somewhat greater than it is for FIG. 4 (18.6% solids). When the feed is still higher in solids concentration, there is even more of an overlap.

sweetness of fructose as compared with that of sucrose varies considerably with temperature being according to one measurement 128.5 at 18° C. as compared with 143.7 at 5° C. Further discussion of these phenomena is given by W. Pigman in "The Carbohydrates," Academic Press, New York, 1957, p. 800. The figures for sweetness given in Table 5 thus must be considered primarily as comparative figures obtained under average, relatively constant conditions by the tasting group employed. The figures may vary somewhat when tasting is done under differing conditions.

The syrups of the present invention have a high content of fermentable sugars, and the compositions of most of the syrups of Table 3 are such that the major proportion of each is rapidly fermentable. In the usual corn syrups, maltose makes up a fairly large portion of the total fermentable sugars present. Since maltose is more slowly fermented by yeasts than is glucose, the usual corn syrups are limited in value where rapid fermentation is required, as for instance in the new continuous process for baking bread.

Both glucose and fructose are rapidly fermented by yeast and thus it is apparent that syrups such as those designated D, E, and G, which contain only 7–9% higher sugars and the remainder largely glucose and fructose, are high in rapidly-fermentable sugars. Baking tests of TABLE 4.—DISTRIBUTION OF SUGARS IN SYRUPS BY WEIGHT BASED ON 100 PARTS OF ORIGINAL SOLIDS

| Syrup | Description | Parts Glucose | Parts Fructose | Parts Other Ketoses | Parts Disaccharides and Higher Sugars | Parts Sugar Removed |
|---|---|---|---|---|---|---|
| B | Substrate for isomerization step | 92–96 | 0 | 0 | 4–8 | |
| C | Product from isomerization step | 59–62 | 27–30 | 2–4 | 8 | |
| D | Product of one pass through molecular exclusion column | 24–27 | 27–30 | 2–4 | 3 | 35 glucose plus 5 disaccharides and higher sugars. |
| E | Product of two passes through molecular exclusion column | 12–15 | 27–30 | 2–4 | 1.2 | 12 glucose plus 1.8 disaccharides and higher sugars. |
| F | Pure fructose fraction from E | 0 | 11.2 | 0 | 0 | 11.2 fructose. |
| G | Product remaining after removal of F from E | 12–15 | 15.8–18.8 | 2–4 | 1.2 | |

As discussed in our co-pending application, sweetness of syrups is an important factor in their economic value, and the figures shown in Table 5 give the ranges of sweetness obtained for the solids portions of the various syrups described above and in Tables 3 and 4. Sweetnesses were determined by taste-testing dilute solutions of the syrups, and are referred to the basis of sucrose solids as 100. On the same basis, invert sugar from sucrose has a sweetness of 105, while fructose has a sweetness of 130.

TABLE 5.—SWEETNESS OF SYRUPS

| Syrup | D.E. | Percent Of Sweetness of Sucrose |
|---|---|---|
| A | 70–85 | 65–80 |
| B | 92–96 | 65–70 |
| C | 92–96 | 85–90 |
| D | 93–97 | 95–100 |
| E | 93–97 | 105–110 |
| F | 100 | 130 |
| G | 92–96 | 100–105 |
| α-D-Glucose | 100 | 70 |
| Invert sugar | 100 | 105 |
| Fructose | 100 | 130 |

Although exact values are given for sweetness of glucose, fructose, and invert sugar, it is generally recognized that the sweetness of such sugars as well as that of the various mixtures of sugars present in syrups A through I may vary depending upon many factors such as sugar concentration, temperature, acidity, mutarotation, and perhaps others. Thus, a freshly-prepared solution of α-D-glucose will be sweeter than one which has stood for some time, since α-D-glucose reverts spontaneously at room temperature in water solution to an equilibrium mixture of the α- and β-forms. As the β-D-glucose portion is less sweet, thee equilibrium mixture is also less sweet than the original fresh solution. Similarly, the such syrups show that they are very satisfactory as the sweetening agent in continuous baking procedures.

Thus, these corn conversion syrups may be substituted for the more expensive sucrose, which is very satisfactory as the sweetener in continuous baking. Sucrose is inverted into equal parts of glucose and fructose by the yeast as the first step in fermentation, and heretofore syrups made from corn starch would not work as well because of their high maltose content.

The syrups of the present invention are even higher in rapidly-fermentable sugars than are those of our co-pending application, which contains 50–60% or more. The present syrups D, E, and G contain about 80% to about 95% rapidly-fermentable sugars, counting only the glucose and fructose. The fermentation properties of the other ketoses are not known fully at the present time, and are disregarded in the above computation.

Syrups of the type described above have many obvious advantages in preparation of all types of food, for example in sweetening of canned and frozen fruits, ice cream, jams, jellies, preserves, table syrups, confectionery, carbonated beverages, canned and frozen fruit juices, and many more.

The following Example I shows a preferred method for producing a product by means of the present invention.

*Example I*

A starch slurry of about 23° Be.' is hydrolyzed with hydrochloric acid, in a manner well known to the art, to 22 D.E. The neutralized liquor is filtered with a filter aid and adjusted to 40% solids. The pH is adjusted to 4.8 and the temperature to 59° C. The 22 D.E. syrup is then treated with 0.5% (D.S.B.) of the amyloglucosidase enzyme "Diazyme L–30" for 72 hours at the foregoing temperature and pH. The resultant syrup has a D.E. of 93.3 and a glucose content of 89.5% (D.S.B.) A treatment with 0.5% (D.S.B.) of activated carbon is then made at a temperature of 75° C. for 30 minutes, followed by filtration and cooling to 65° C. At the latter temperature the syrup is treated with a concentrated solution of sodium hydroxide to raise the pH to 9.0, and both temperature and pH are maintained at these values for a period of 4 hours to produce a syrup having the following composition: glucose 70.6% D.S.B., ketose 21.4%, disaccharides and higher sugars 9%.

The syrup is passed immediately through an ion-exchange column operating in the sodium cycle to remove heavy metal ions from the syrup. This operation is sometimes called softening, and involves use of any of the customary cation exchange resins such as Dow "Dowex 50 X 8" of 20–50 mesh in the sodium form. The effluent from the column is heated to 82° C., and it is then introduced into an ion exclusion column where substantially all of the salts and a major portion of the color and organic degradation products of the earlier alkaline isomerization reaction are removed in one pass. The column is jacketed for circulation of hot water, and the resin bed is 2 inches in diameter and 3 feet high. The resin used is for example "Dowex 50 WX-4," a strong acid cation exchange resin in the sodium form. The resin is polystyrene cross-linked with 4% divinylbenzene and is 50–100 mesh. The liquor is passed into the column at the rate of 0.5 gallon per minute per square foot of cross-sectional area of the column. Total volume of feed is 450 ml. at 40% solids. Soft water is then introduced at the rate of 0.5 gallon per minute per square foot of cross-sectional area. Effluent is collected in successive fractions of 100 ml. each. The data are given in FIG. 2. The salt and other impurities appear early in the effluent, while the sugar solids come off in the later fractions.

If further purification is desired, it is accomplished by passing the effluents from the ion exclusion column through ion exchange equipment, either of the monobed type, where resins such as Rohm and Haas "XE 168" and "Amberlite 200" are employed, or of the separate cation and anion type, where the above or other standard types of ion exchange resins are used in series, to remove final traces of salts and coloring matter.

A composite of several fractions of the purified syrup is then cooled to 25° C. and passed into a molecular exclusion column which contains an ion exchange resin such as "Dowex 50 WX4" at 50–100 mesh in the strontium form. The column is 2 inches in diameter and 3 feet 6 inches high. Flow rate is 0.1 gallon per minute per square foot of cross-sectional area. Volume of feed is 350 ml. Deionized water is then passed into the column at the same rate. Fractions of 100 ml. each are removed, the early ones consisting primarily of glucose, disaccharides, and higher sugars. Compositions of the effluent fractions are given in Table 1 and the separation curves are plotted in FIG. 3. While the data shown do not indicate disaccharides and higher sugars, these appear predominantly in the early fractions (2 through 6). However, there are traces of these in all portions of the effluent. Fractions 7 through 14 are now mixed and concentrated to a solids concentration of 82%, at which point the Baumé is 43° and the syrup is transparent, water-white, viscous, highly sweet, not subject to microbiological spoilage, and is stable against crystallization for an indefinite period at room temperature. Composition of the syrup on the dry solids basis is glucose 43.9%, fructose 45.7%, other ketoses 2.3%, and disaccharides and higher sugars 8.1%.

The effluent fractions from the molecular exclusion column containing predominantly glucose and disaccharides are mixed, concentrated to 40% solids and added to the subsequent batch of high-glucose liquor prior to isomerization.

Example II

Example I is followed to the point where alkaline isomerization is begun. All other conditions being the same as in Example I, the alkaline reaction is maintained for a total period of 5.5 hours, and the resulting syrup has the following composition: glucose 61.5% D.S.B., ketose 29.5%, disaccharides and higher sugars 9%.

The syrup is softened, heated to 82° C., and passed into the ion exclusion column as in Example I. The separation curves obtained are given in FIG. 4.

A composite of several fractions of the purified syrup is then cooled to 25° C. and passed into the molecular exclusion column for separation. Compositions of the effluent fractions are given in Table 2. Again the major portion of the disaccharides and higher sugars appears in the early fractions, but small quantities appear in all.

Fractions 7 through 14 are now mixed and concentrated to 82% solids, at which point the syrup is transparent, water-white, viscous, highly sweet, not subject to microbiological spoilage, and is stable against crystallization for a period of at least 4 months at room temperature. Composiiton on the solids basis is glucose 41.4%, ketose 50.2%, disaccharides 1.9% and higher sugars 6.5%.

Example III

A portion of the final syrup of Example II containing 100 grams of solids is diluted to 30% solids and passed through the molecular exclusion column. Fractions are collected as before, and early fractions containing 20 grams of glucose and 3 grams of disaccharides and higher sugars are removed and combined. The final fractions containing 25 grams of pure fructose are also combined. The remaining central fractions are mixed and concentrated to 82% solids. The resulting syrup has the following composition: glucose 41.2%, fructose 48.5%, other ketoses 3.7%, disaccharides and higher sugars 6.6%.

The fructose portion removed is concentrated separately to 82% solids, and the glucose-disaccharides and higher portion is concentrated to 40% solids and returned to the isomerization step in a subsequent batch.

Although both the above glucose and fructose portions are obtained separately in a single pass through a fixed-bed molecular exclusion column, the semi-continuous molecular exclusion columns of the Higgins or Asahi types are not presently arranged to separate more than two fractions in a single pass. Therefore it is necessary when using the moving-bed type of column to make two passes to achieve the foregoing result. Further development of continuous-bed methods may permit separation of more than two fractions in a single pass.

This invention is intended to cover all changes and modifications of the examples of the invention herein chosen for purposes of the disclosure, which do not constitute departures from the spirit and scope of the invention.

What we claim is:

1. A non-crystallizing corn type starch conversion syrup having a D.E. of from about 85 to about 100, from about 20 to about 65% ketoses including at least 15% fructose, less than about 45% glucose, said syrup being essentially free of organic acids and ash and including at least 3 percent disaccharides and higher sugars.

2. A non-crystallizing substantially clear corn type starch conversion syrup having a D.E. of about 85 to about 100, from about 20 to about 65% ketoses including from about 15 to about 60% fructose, at least 60% of its carbohydrates being rapidly yeast fermentable, and less than 45% glucose, said syrup being essentially free of organic acids and ash and including at least 3 percent disaccharides and higher sugars.

3. A corn type starch conversion syrup having about 95 D.E., about 50 to about 55% ketoses, of which about 47 to about 50% are fructose, and no more than 45% glucose, about 85 to about 90% of its carbohydrates being yeast fermentable, said syrup being about 95 to about 100% as sweet as pure sucrose and being essentially free of organic acids and ash, said syrup also being non-crystallizing on standing and including at least 3 percent disaccharides and higher sugars.

4. A corn type starch conversion syrup having about 95 D.E., about 53 to about 61% ketoses of which about 48 to about 56% are fructose, and no more than 45% glucose, about 83 to about 95% of its carbohydrates being yeast fermentable, said syrup being about 100 to about 105% as sweet as pure sucrose and being essentially free of organic acids and ash, said syrup also being non-crystallizing on standing and including at least 3 percent disaccharides and higher sugars.

5. A method of making a high D.E. sweet starch conversion syrup including the steps of acid converting starch to obtain a first substrate, enzyme converting said first substrate to obtain a high glucose substrate of a D.E. of above about 85, continuously maintaining the pH of the high glucose substrate at a value between 8.5–9.5, recovering a syrup containing about 45 to about 80% glucose and at least 15% fructose, purifying said syrup, and then removing a portion of the glucose so that the remaining syrup contains less than 45% glucose, is essentially free of organic acids and ash, and includes at least 3 percent disaccharides and higher sugars.

6. The method defined in claim 5 wherein said high glucose substrate is treated with about 0.001 to 0.025 gram alkali per gram dry solids for about 1–5 hours at a temperature of about 60–68° C.

7. The method defined in claim 5 wherein the purification includes the step of passing said syrup through an ion exclusion column and subsequently an ion exchange column.

8. The method defined in claim 5 wherein said substrate contains about 60–95% glucose and has a D.E. of about 85–100.

9. The method defined in claim 8 wherein said purification includes the step of passing the syrup through an ion exchange column.

10. The method defined in claim 9 wherein said ion exchange column includes a weak base anion exchange resin and a strong acid cation exchange resin.

11. The method defined in claim 5 wherein the purification includes the step of passing said syrup through an ion exclusion column.

12. The method defined in claim 11 wherein said ion exclusion column includes a strong acid cation exchange resin in sodium form, said resin being about 4% cross-linked and being of about 50–100 mesh.

13. A method of making a starch conversion syrup including the steps of treating a starch conversion substrate having a D.E. of about 18–55 with an amyloglucosidase, recovering a product having a D.E. of above about 85 and above 60% glucose, isomerizing said product with about 0.001 to about 0.025 gram alkali per gram of dry solids, continuously maintaining the pH of said product between 8.5 and 9.5 during the isomerization treatment, recovering a syrup having a D.E. above 85, more than 45% glucose, at least 20% ketoses of which at least 15% is fructose, at least about 60% rapidly yeast fermentable carbohydrates, purifying said syrup, and subsequently removing a portion of the glucose to bring the glucose content of the remaining syrup below 45%.

14. The method defined in claim 13 wherein the purification step includes passage of the syrup through an ion exclusion column containing a sulfonated styrene divinyl benzene resin of about 4% divinylbenzene cross-linkage and about 50–100 mesh.

15. The method defined in claim 13 wherein the glucose removed is returned to the isomerization step in a subsequent portion of high-glucose-containing substrate.

16. The method defined in claim 13 wherein glucose removal is accomplished by passage of the syrup through a molecular exclusion column containing a sulfonated styrene divinyl benzene resin of about 4% divinylbenzene cross-linkage of about 50–100 mesh in the strontium, barium, or calcium form.

17. The method defined in claim 16 wherein a further portion of glucose is removed by passage of the syrup through a second molecular exclusion column of the type described.

18. The method defined in claim 17 wherein a portion of the fructose contained in the syrup is removed by passage of the syrup through a molecular exclusion column of the type described.

19. A method of making a high D.E. starch conversion syrup comprising the steps of treating a starch slurry with acid to produce a starch conversion syrup having a D.E. of 18–55, treating said acid conversion syrup with an amyloglucosidase enzyme to produce a syrup having a D.E. of about 85–100 and including about 60–95% glucose, treating said enzyme conversion syrup with an alkali for about 1 to about 5 hours at a temperature of about 60–68° C., continuously maintaining the pH during said alkali treatment at a predetermined value between 8.5 and 9.5, recovering a syrup having a D.E. of about 85–100 and including more than 45% glucose and more than about 20% ketoses, purifying said syrup, passing the purified syrup through a molecular exclusion column to remove a portion of the glucose, and recovering a non-crystallizing sweet syrup having a glucose content no higher than 45% and a D.E. of 85–100, said syrup being essentially free of organic acids and ash.

20. The method defined in claim 19 wherein said acid converted syrup has a D.E. of about 22, the non-crystallizing final syrup product includes from about 20–65% ketoses of which about 15–60% is fructose, and above about 65% fermentables.

21. The method defined in claim 19, wherein said enzyme conversion syrup has a D.E. of about 95 and the non-crystallizing final syrup product includes from about 50–55% ketoses of which about 47–50% are fructose, and above about 85% fermentables.

References Cited by the Examiner

UNITED STATES PATENTS

| | | | |
|---|---|---|---|
| 2,069,064 | 1/1937 | Gore et al. | 127—58 X |
| 2,354,664 | 8/1944 | Cantor et al. | 127—36 |
| 2,871,147 | 1/1959 | Smith | 127—46.1 X |
| 2,890,972 | 6/1959 | Wheaton | 127—46.2 |
| 3,044,905 | 7/1962 | Lefevre | 127—46 |
| 3,067,066 | 12/1962 | Ehrenthal | 127—38 |

MORRIS O. WOLK, *Primary Examiner.*

MICHAEL E. ROGERS, *Examiner.*